(12) United States Patent
Matsumura

(10) Patent No.: US 11,529,709 B2
(45) Date of Patent: Dec. 20, 2022

(54) CONTROL DEVICE AND CONTROL SYSTEM FOR MACHINE TOOL

(71) Applicant: FANUC CORPORATION, Yamanashi (JP)

(72) Inventor: Hiroshi Matsumura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 150 days.

(21) Appl. No.: 17/015,079

(22) Filed: Sep. 9, 2020

(65) Prior Publication Data
US 2021/0069849 A1 Mar. 11, 2021

(30) Foreign Application Priority Data
Sep. 11, 2019 (JP) .............................. JP2019-165710

(51) Int. Cl.
*B23Q 15/26* (2006.01)
*B23Q 17/22* (2006.01)

(52) U.S. Cl.
CPC ......... *B23Q 17/2241* (2013.01); *B23Q 15/26* (2013.01); *B23Q 2717/006* (2013.01)

(58) Field of Classification Search
None
See application file for complete search history.

(56) References Cited

U.S. PATENT DOCUMENTS

| 5,224,404 A | 7/1993 | Kono et al. | |
|---|---|---|---|
| 2007/0196190 A1* | 8/2007 | Bourne | B23Q 17/2241 409/80 |

FOREIGN PATENT DOCUMENTS

JP    H4164557 A    6/1992

* cited by examiner

*Primary Examiner* — Ryan A Jarrett
(74) *Attorney, Agent, or Firm* — Hauptman Ham, LLP

(57) ABSTRACT

Processing data during polygon processing is stored in the processing data storage unit 17. The position detection unit 18 detects a cut-start position A and a cut-end position B of a workpiece based on a change in the processing data. The position detection unit 18 detects a processing surface based on the cut-start position A and the cut-end position B.

5 Claims, 16 Drawing Sheets

CONTACT (CUT START)  RELEASE (CUT END)

CUT START (A°)

ANGLE FROM CUT START TO PROCESSING SURFACE CENTER POSITION

R: EXTERNAL SHAPE OF TOOL (TOOL COMPENSATION AMOUNT)
D: EXTERNAL SHAPE OF WORKPIECE (WORKPIECE DIAMETER BEFORE POLYGON PROCESSING)
X: CUTTING AMOUNT

PROCESSING SURFACE CENTER POSITION p1 = ($P_{11}$ + $P_{21}$ + ⋯ + $P_{n1}$) /n
PROCESSING SURFACE CENTER POSITION p2 = ($P_{12}$ + $P_{22}$ + ⋯ + $P_{n2}$) /n

\* n : NUMBER OF TURNS

FIG. 10

PROGRAM EXAMPLE 1:
OUTPUT PROCESSING SURFACE CENTER POSITIONS (ANGLES) P1, P2, ⋯, Pm TO VARIABLE #3301, #3302, ⋯, #330m AND USE VARIABLE IN PROGRAM

```
G00 C#3301 ;        //Move to P1 face
G00 C#3304 ;        //Move to P4 face
G00 C[#3305+30.0]   //Move to P5 face + 30 degrees
```

PROGRAM EXAMPLE 2:
CREATE INSTRUCTION TO MOVE THE AXIS
・ASSOCIATE PROCESSING SURFACE CENTER POSITIONS P1, P2, ⋯, Pm WITH INSTRUCTION P1, P2, ⋯, Pm
・SPECIFY ROTATION ANGLE FROM P_ AT Q_
・SPECIFY WORKPIECE AXIS (C-AXIS HEREIN)

```
G00 C00 P1 ;        //Move to P1 face of C-AXIS
G00 C00 P4 ;        //Move to P4 face of C-AXIS
G00 C00 P5 Q30.0    //Move to P5 face + 30 degrees
```

FIG. 12A

LOAD TORQUE (TOOL AXIS)

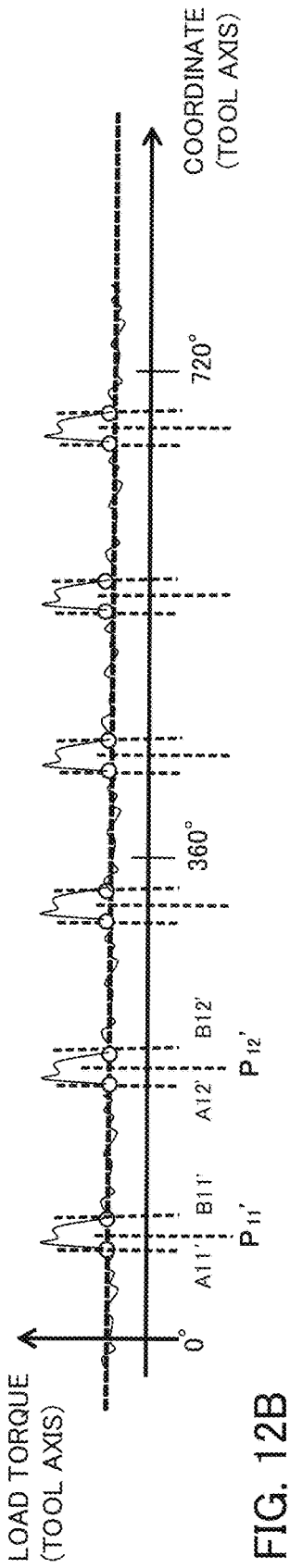

$P_{11}'$ $P_{12}'$ $A_{11}'$ $B_{11}'$ $A_{12}'$ $B_{12}'$ 0° 360° 720° COORDINATE (TOOL AXIS)

FIG. 12B $P_{11}' = A_{11}' + (B_{11}' - A_{11}')/2$
$P_{12}' = A_{12}' + (B_{12}' - A_{12}')/2$
$\vdots$

CONVERSION INTO USE FOR WORKPIECE AXIS $P_{11}'' = \theta + P_{11}'/2$
$P_{12}'' = \theta + P_{12}'/2$
$\vdots$
$P_{16}'' = \theta + P_{16}'/2$ TURN RATIO OF TOOL AND WORKPIECE AXES 2:1
INITIAL PHASE DIFFERENCE $\theta$

FIG. 12C

CALCULATE PROCESSING SURFACE CENTER POSITION OF WORKPIECE AXIS FROM DATA OF WORKPIECE AXIS AND TOOL AXIS (* n: NUMBER OF TURNS OF WORKPIECE AXIS)

PROCESSING SURFACE CENTER POSITION 1 P1 = $(P_{11} + P_{21} + \cdots + P_{n1} + P_{11}'' + P_{21}'' + \cdots + P_{n1}'')/2n$ PROCESSING SURFACE CENTER POSITION 2 P2 = $(P_{12} + P_{22} + \cdots + P_{n2} + P_{12}'' + P_{22}'' + \cdots + P_{n2}'')/2n$ $\vdots$ FIG. 16A
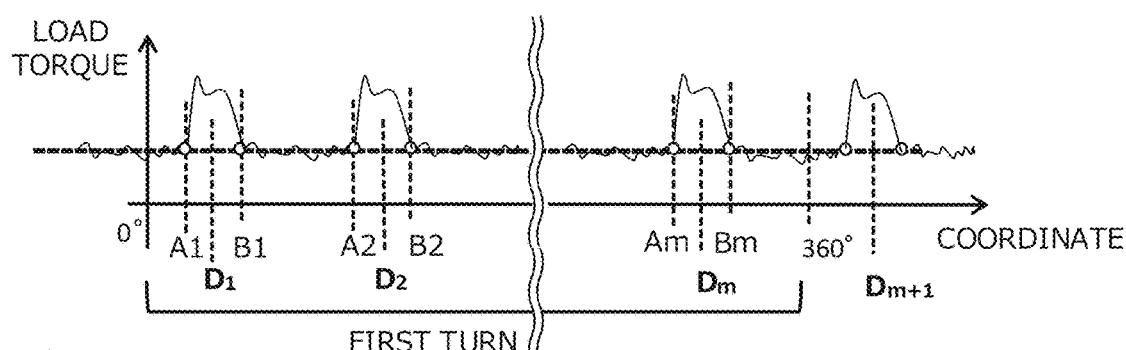
FIG. 16B
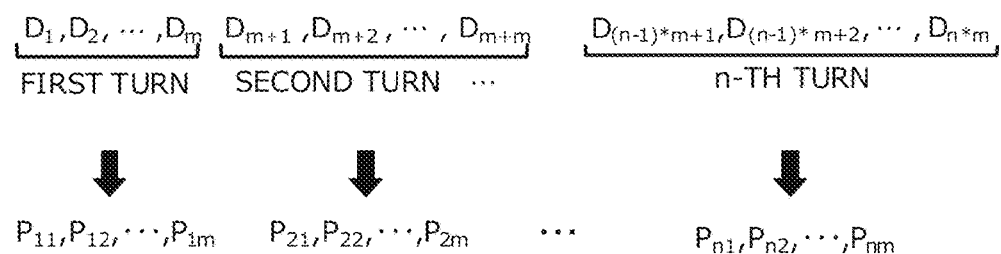
FIG. 16C
$P_1 = (P_{11} + P_{21} + \cdots + P_{n1})/n$
$P_2 = (P_{12} + P_{22} + \cdots + P_{n2})/n$
...
$P_n = (P_{1m} + P_{2m} + \cdots + P_{nm})/n$

FIG. 17

PROGRAM EXAMPLE:

```
O0001 ;
...
G00X100.0Z20.0S1000M03 ;
G51.2 P1 Q2 ;           (Polygon processing start)
G01X80.0F10.0 ;         (X-axis cutting)
G04X2.0 ;               (Standby for 2 seconds)
G00X100.0 ;             (X-axis retract)
G50.2 ;                 (Polygon processing end)
S0M05 ;                 (Workpiece axis stop)
...
T2                      (Select tool (drill))
...
G00X50.0 ;
G83C#3301X-40.0F5.0 ;   (Drilling in P1 face)
C#3302 ;                (Drilling in P2 face)
C[#3305+30.0] ;         (Drilling in face inclined by 30 degrees from P5 face)
G80M5 ;
M30 ;
```

CONTROL DEVICE AND CONTROL SYSTEM FOR MACHINE TOOL

RELATED APPLICATIONS

The present application claims priority to Japanese Patent Application Number 2019-165710 filed Sep. 11, 2019, the disclosure of which is hereby incorporated by reference herein in its entirety.

BACKGROUND OF THE INVENTION

1. Field of the Invention

The present invention relates to a control device and a control system for a machine tool.

2. Description of the Related Art

Polygon processing is a technology of rotating a tool and a workpiece at a constant ratio and thereby processing the workpiece into a polygon shape. Polygon processing processes a workpiece into a polygon such as a rectangular, a hexagon, or the like by changing the rotational ratio between the workpiece and a tool and the number of blades of a polygon processing tool.

In polygon processing, after a polygon is formed on a workpiece surface, additional processing such as drilling may be applied thereto. In such a case, it is necessary to calculate the center position of the processing surface of the workpiece and perform accurate positioning between the workpiece and the tool.

The position of a tool axis (blade edge position) needs to be acquired in advance before the polygon processing to calculate a processing surface after polygon processing. When the blade edge position is unknown, the user needs to perform preparatory planning workpiece before polygon processing is started such as matching the blade edge position to the center position of the processing surface.

As a method of adjusting the position of corners of a polygon, Japanese Patent Application Publication No. H4-164557 discloses that "when a polygon shape of a workpiece is processed, a tool position is shifted from a processing start position on a workpiece by a difference in a position deviation obtained by dividing instructed rates for two main axes by respective positional loop gains, driving of the two main axes is started, processing is started from the setting position of the workpiece by starting processing after the two main axes reach the instructed rates, and thereby the corners of the polygon shape are arranged at the peripheral surface setting position of the workpiece".

However, this technology is to adjust the position of the corners of a polygon formed by polygon processing and is not applicable to positioning between a tool and a workpiece in additional processing after polygon processing.

SUMMARY OF THE INVENTION

Therefore, in the field of machine tools, there is a demand for a technology for detecting the position of a processing surface formed on a workpiece by polygon processing.

A control device of one aspect of the present disclosure is a control device that controls a machine tool having a first axis that rotates a tool and a second axis that rotates a workpiece and configured to rotate the first axis and the second axis and process the workpiece into a polygon, and the control device includes: a processing data acquisition unit that acquires processing data that changes in accordance with processing of the workpiece; and a position detection unit that detects a position of a processing surface on the workpiece based on a change in the processing data.

A control system of one aspect of the present disclosure is a control system that controls a machine tool having a first axis that rotates a tool and a second axis that rotates a workpiece and configured to rotate the first axis and the second axis and process the workpiece into a polygon, and the control device includes: a processing data acquisition unit that acquires processing data that changes in accordance with processing of the workpiece; and a position detection unit that detects a position of a processing surface on the workpiece based on a change in the processing data.

BRIEF DESCRIPTION OF THE DRAWINGS

FIG. 10 is a diagram illustrating a program example using variables;

FIGS. 12A to 12C are diagrams illustrating an axis conversion process;

FIGS. 16A to 16C are diagrams illustrating the process in a representative value calculation unit; and FIG. 17 illustrates a program example of the present embodiment.

DETAILED DESCRIPTION OF THE PREFERRED EMBODIMENTS

An embodiment will be illustrated below in which a control device of the present disclosure is mounted on a numerical control device 100.

Figure 1:
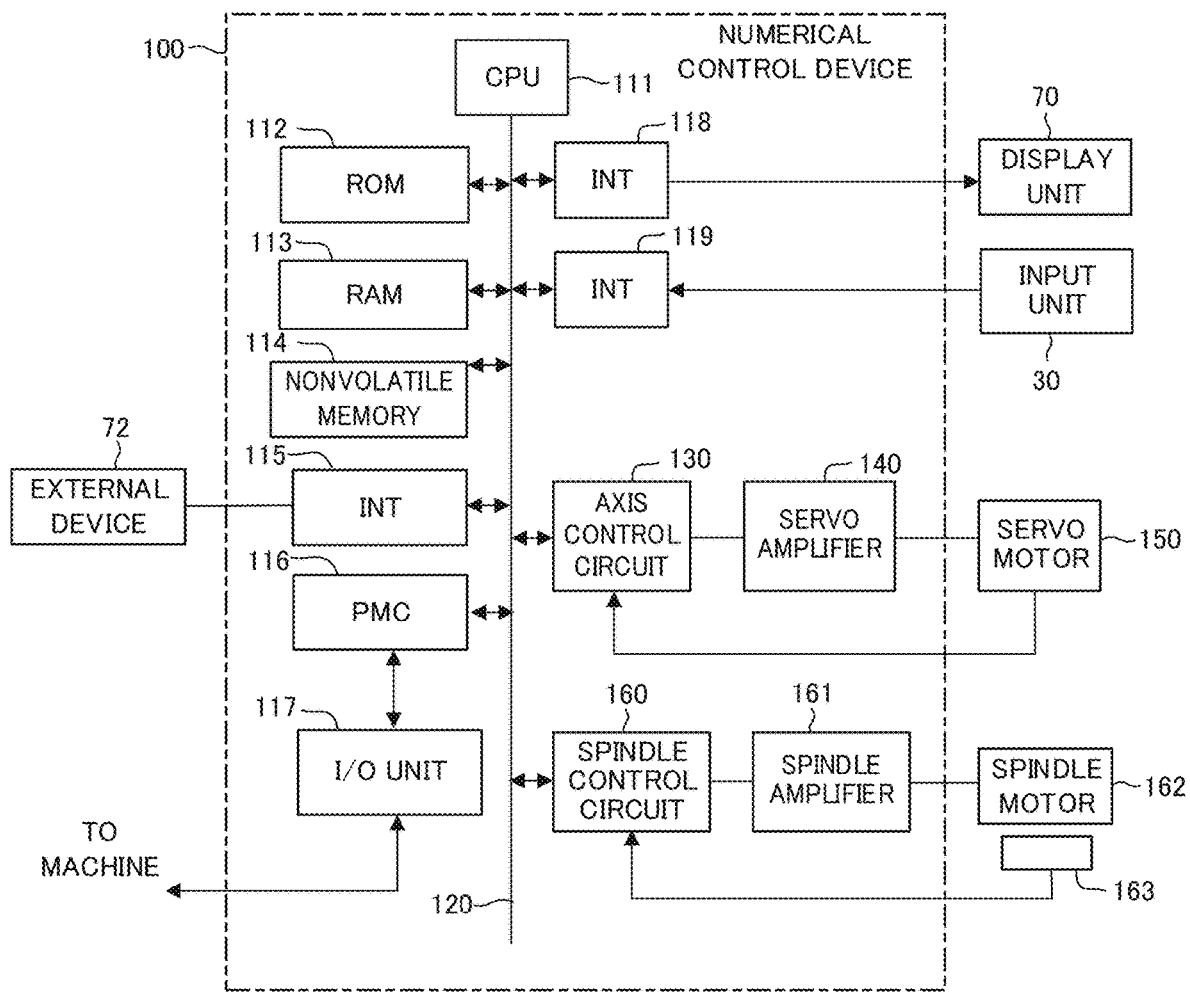
FIG. 1 is a hardware configuration diagram of a numerical control device in the present embodiment.

FIG. 1 is a hardware configuration diagram of the numerical control device 100.

A CPU 111 of the numerical control device 100 according to the present embodiment is a processor that generally controls the numerical control device 100. The CPU 111 reads a system program stored in a ROM 112 via a bus 120 and controls the overall numerical control device 100 in accordance with the system program. A RAM 113 temporarily stores transitory calculation data or display data, various data input by an operator via an input unit (not illustrated), or the like.

A nonvolatile memory 114 is formed of a memory device, a solid state drive (SSD), or the like backed up by a battery (not illustrated), for example. The nonvolatile memory 114 holds a storage state even when the power supply of the numerical control device 100 is turned off. The nonvolatile memory 114 stores a program loaded from an external device 72 via an interface 115 or a program input via an input unit 30 or various data acquired from each component of the numerical control device 100, a machine tool, or the like (for example, a setting parameter acquired from a machine tool or the like). A program or various data stored in the nonvolatile memory 114 may be loaded to the RAM 113 when executed or used. Further, various system programs such as a known analysis program are written in advance in the ROM 112.

The interface 115 is an interface used for connecting the numerical control device 100 and the external device 72 such as an adaptor to each other. A program, various parameters, or the like are loaded from the external device 72 side. Further, a program, various parameters, or the like compiled inside the numerical control device 100 can be stored in an external storage unit via the external device 72. A programmable machine controller (PMC) 116 inputs and outputs a signal to and from a machine tool or a robot or a device such as a sensor attached to the machine tool or the robot for control via an I/O unit 117 and perform control in accordance with a sequence program incorporated in the numerical control device 100.

Various data loaded on a memory device, data obtained as a result of execution of a program or the like, or the like are output to a display unit 70 via an interface 118 and displayed thereon. Further, an input unit 30 formed of an MDI, an operation panel, a touch panel, or the like passes an instruction, data, or the like based on an operation by a worker to the CPU 111 via an interface 119.

An axis control circuit 130 controls each axis of the machine tool. The axis control circuit 130 receives a motion instruction amount of the axis from the CPU 111 and outputs an instruction for the axis to a servo amplifier 140. The servo amplifier 140 receives such an instruction and drives a servo motor 150 that moves the axis provided in the machine tool. The servo motor 150 of the axis has a built-in position/speed detector and feeds a position/speed feedback signal from the position/speed detector back to the axis control circuit 130 to perform feedback control of the position/speed. Note that, although the hardware configuration diagram of FIG. 1 illustrates only a single axis control circuit 130, a single servo amplifier 140, and a single servo motor 150, each of these components is provided for the number of axes provided in a machine tool to be controlled in the actual implementation. In the function block diagram (FIG. 2) described later, the control device of the present embodiment has a tool axis driven by a servo motor.

A spindle control circuit 160 outputs a spindle speed signal to a spindle amplifier 161 in response to a rotation instruction to main axis of the machine tool. The spindle amplifier 161 receives the spindle speed signal and rotates a spindle motor 162 of the main axis at the instructed rotational rate. The spindle motor 162 drives a workpiece axis. A position coder 163 is coupled to the spindle motor 162. The position coder 163 outputs feedback pulses in synchronization with rotation of the main axis, and the feedback pulses are read by the CPU 111.

Figure 2:
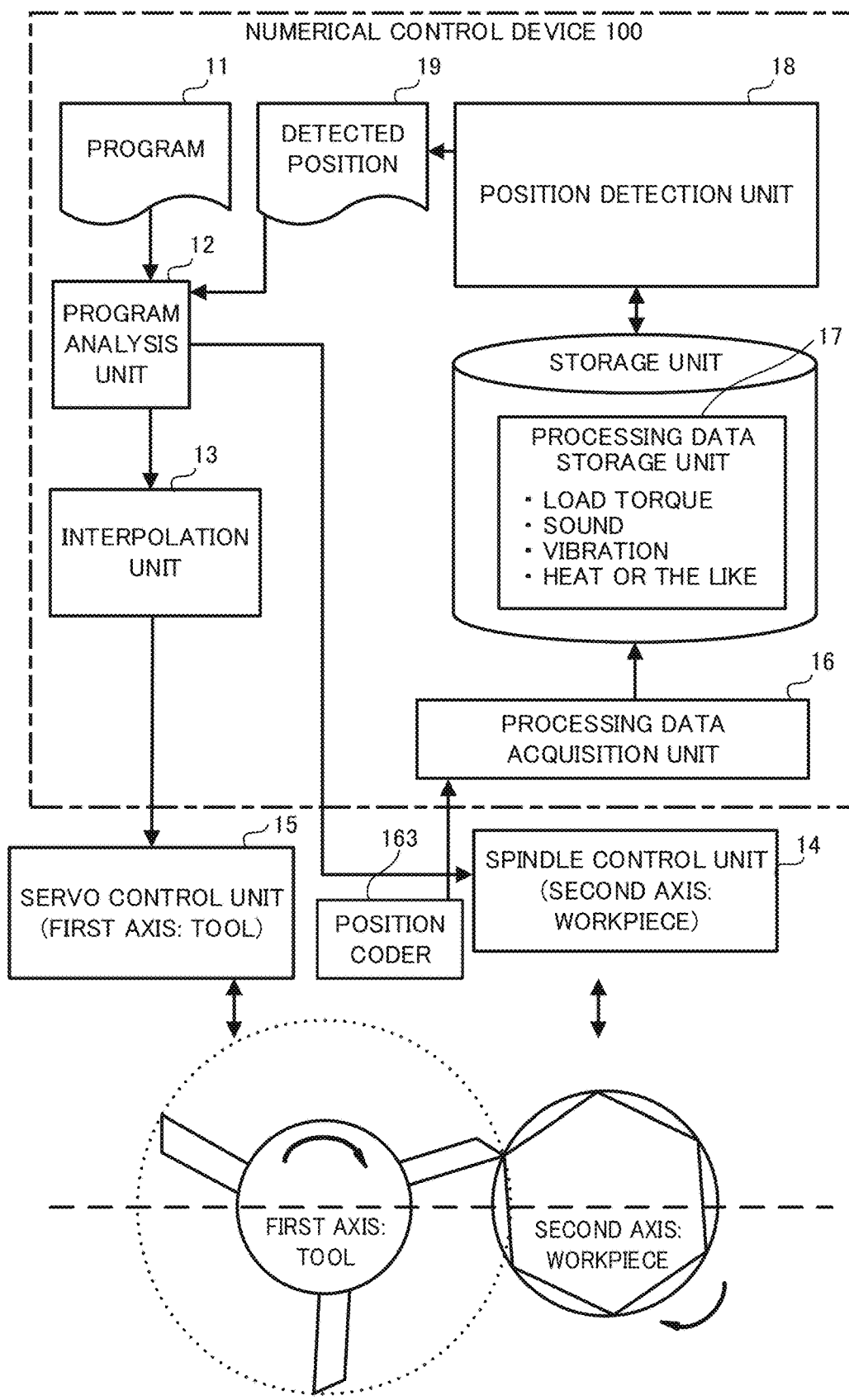
FIG. 2 is a block diagram of the numerical control device in the present embodiment.

FIG. 2 is a main part block diagram of the numerical control device 100 that is one embodiment of the present disclosure. The numerical control device 100 has a program 11 describing a coordinate system of the machine tool, a processing instruction, an end instruction, or the like, a program analysis unit 12 that analyzes the program 11 to create a motion instruction for an interpolation unit 13 and an axis rotation instruction for a spindle control unit 14, the interpolation unit 13 that calculates an instructed path of a tool, creates interpolation data based on the motion instruction from the program analysis unit 12 and outputs the interpolation data to a servo control unit 15, the spindle control unit 14 that rotates a workpiece in accordance with the axis rotation instruction from the program analysis unit 12, the servo control unit 15 that rotates the tool in accordance with the interpolation data, a processing data acquisition unit 16 that acquires processing data during polygon processing, a processing data storage unit 17 that stores processing data acquired by the processing data acquisition unit 16, and a position detection unit 18 that detects the position of the processing surface of a workpiece based on the processing data stored in the processing data storage unit 17. Note that, although the tool axis is driven by the servo motor 150 and the workpiece axis is driven by the spindle motor 162 in the present embodiment, both the axes may be driven by a servo motor.

The processing data acquisition unit 16 acquires processing data during polygon processing. The processing data may be load torque, processing sound, vibration, heat, or the like. For example, when a tool comes into contact with a workpiece, a phenomenon that the load torque rises, a particular sound occurs, the tool or the workpiece vibrates, a contact portion generates heat, or the like occurs. The processing data acquisition unit 16 acquires such processing data that changes during processing of polygon processing.

The processing data acquisition unit 16 also acquires the position (angle) of the rotation axis (first axis) of the tool and the rotation axis (second axis) of the workpiece. The processing data acquisition unit 16 acquires position information on the rotation axis of a workpiece from the position coder 163 and acquires position information on the rotation axis of a tool from the servo control unit 15. The processing data storage unit 17 stores processing data acquired by the processing data acquisition unit 16 during polygon processing. The processing data is stored in association with position information on the tool axis and the workpiece axis.

Figure 3:
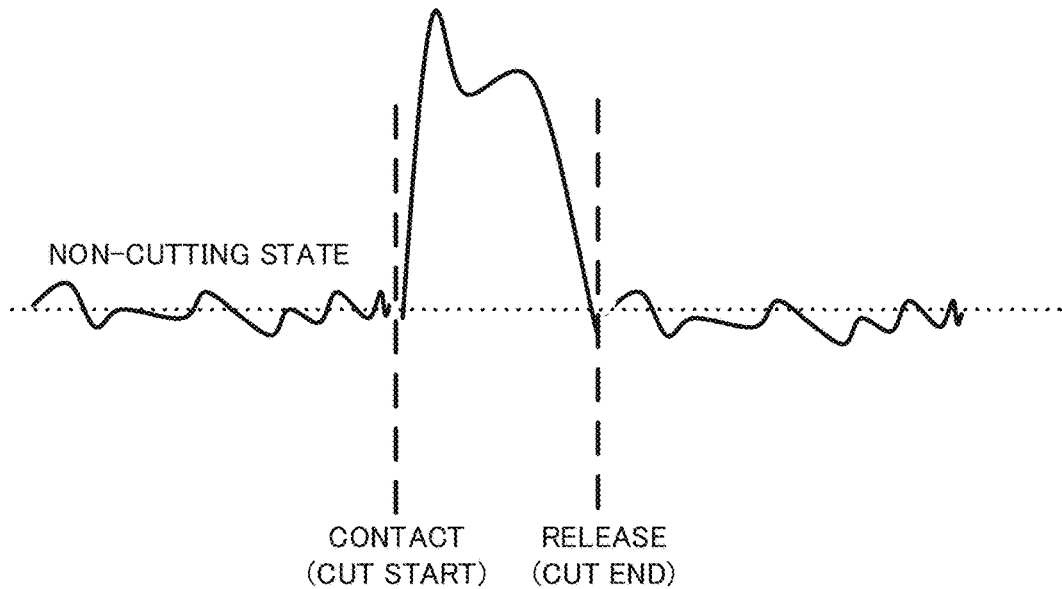
FIG. 3 is a graph illustrating an example of change in load torque.

Change in processing data during polygon processing will be described with reference to FIG. 3. Although load torque that is one of the processing data is used as an example in the following description, another processing data may be used.

In polygon processing, a tool and a workpiece are simultaneously rotated. At this time, the tool is not always in contact with and is cutting the workpiece, and there is a state where the tool and the workpiece are not in contact with each other (referred to as "non-cutting state"). In the non-cutting state, since the tool is running idle, the load torque changes within low values. When the tool starts cutting the workpiece, that is, the tool and the workpiece come into contact with each other, the load torque increases (a rising edge of the load torque). Then, the load torque is high while the tool is cutting the workpiece, and the load torque decreases when the tool is released from the workpiece, that is, finishes cutting the workpiece (a falling edge of the load torque).

The position detection unit 18 detects the position of the processing surface of a workpiece based on a change in the value of processing data. The detection method differs in accordance with the type of processing data. When a processing sound is used as processing data, the position of the processing surface is detected based on a sound occurring when the tool and the workpiece come into contact with each other, a sound occurring when the tool is cutting the workpiece, a sound occurring when the tool is running idle, or the like. When vibration is used as processing data, the position of the processing surface is detected based on vibration occurring when the tool and the workpiece come into contact with each other, vibration occurring when the tool is cutting the workpiece, vibration occurring when the tool is running idle, or the like. When heat is used as processing data, the position of the processing surface is detected based on heat occurring when the tool and the workpiece come into contact with each other, heat occurring when the tool is cutting the workpiece, or the like.

The position of the processing surface detected by the position detection unit 18 is stored as a detected position 19. Position information on the processing surface stored as the detected position 19 is an object to be analyzed by the program analysis unit 12. In the numerical control device 100 of the present form, since the position detection unit 18 automatically detects the position of the processing surface, the numerical control device 100 can automatically recognize the position of the cutting surface of a workpiece, which eliminates the need for preparatory planning such as matching the tool position to the workpiece center position before polygon processing or additional processing.

Figure 4:
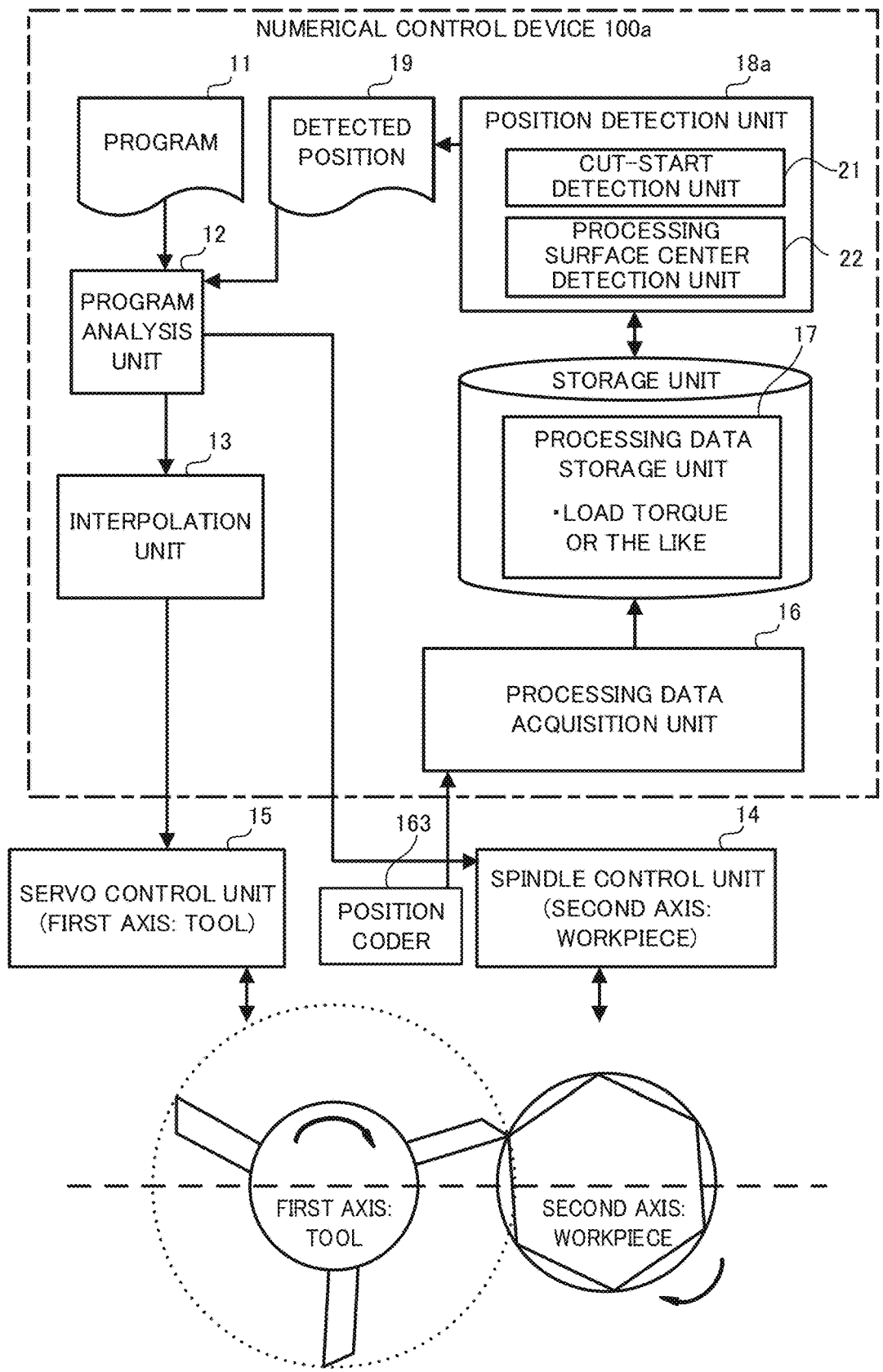
FIG. 4 is a block diagram of a numerical control device in the present embodiment.

Next, a numerical control device 100a that is another form of the present disclosure will be described with reference to FIG. 4. A position detection unit 18a of the numerical control device 100a has a cut-start detection unit 21 that detects start of cutting of the processing surface from processing data and a processing surface center detection unit 22 that finds the center position of a processing surface of a workpiece based on the position of a workpiece axis when the start of cutting is detected.

The cut-start detection unit 21 detects start of cutting of a workpiece based on a change in processing data, and the method of detecting the start of cutting differs in accordance with the type of processing data (load torque, processing sound, vibration, heat, or the like) as described above. The cut-start position is defined such that the position (angle) of the rotation axis of a workpiece at the start of cutting. The cut-start position is described as symbol A hereinafter.

Figure 5:
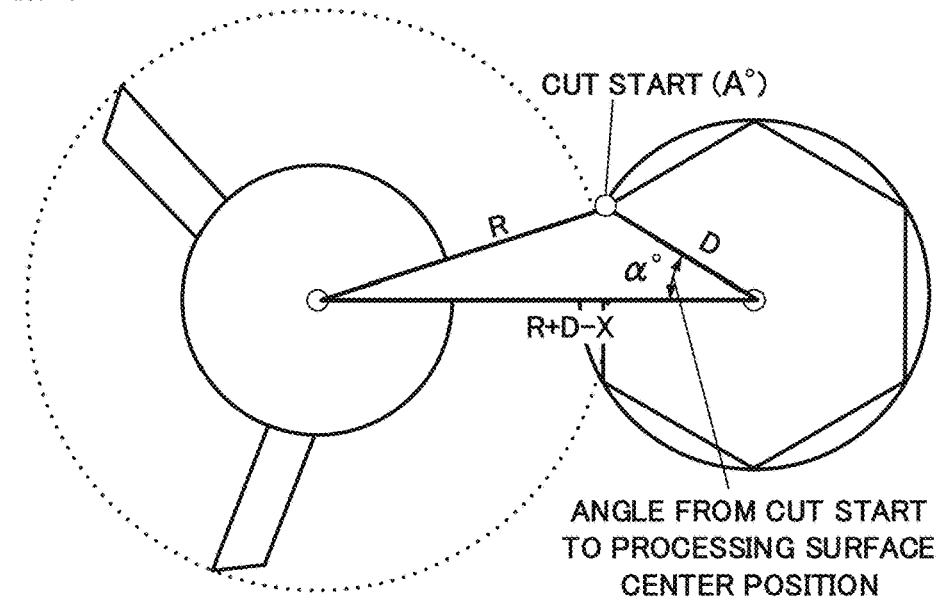
FIG. 5 is a diagram illustrating a detection method in a processing surface center detection unit.

FIG. 5 is a diagram illustrating a method of calculating an angle α of the processing surface center position relative to the position A of the tool rotation axis at start of cutting a workpiece. The triangle connecting the center of the workpiece rotation axis, the center of the tool rotation axis, and the point of start of cutting is a triangle having the side lengths R, D, and R+D−X, where the external shape of the tool (tool compensation amount) is denoted as R, the external shape of the workpiece (workpiece diameter before polygon processing) is denoted as D, and a cutting amount of the tool is denoted as X. Since the side connecting the center of the workpiece rotation axis and the center of the tool rotation axis passes on the center of the processing surface of the workpiece, the angle α of this side relative to the side of the length D is the difference between the cut-start position and the processing surface center position.

The angle α can be calculated as below by using law of cosines.

$$R^2 = D^2 + (R+D-X)^2 - 2D(R+D-X)\cos \alpha \ast \text{Law of cosines}$$

$$\cos \alpha = ((R+D-X)^2 - R^2 + D^2)/(2D(R+D-X))$$

$$\alpha = \arccos(((R+D-X)^2 - R^2 + D^2)/(2D(R+D-X)))$$

A position detection unit 18a adds α to the angle A when start of cutting is detected to find the processing surface center position (A+α).

Figure 6:
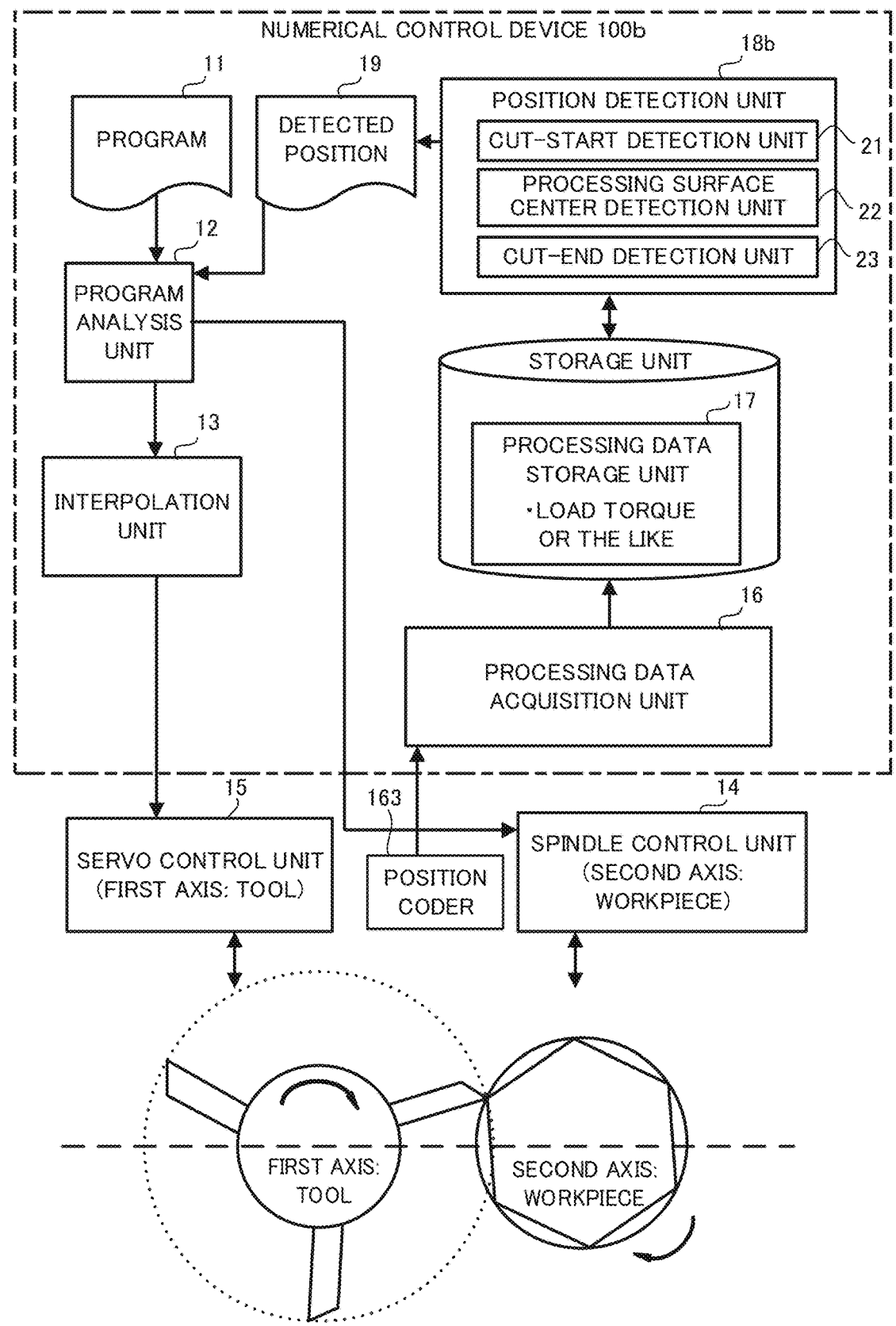
FIG. 6 is a block diagram of a numerical control device in the present embodiment.

Next, a numerical control device 100b that is another embodiment of the present disclosure will be described with reference to FIG. 6. Position detection unit 18b of the numerical control device 100b has the cut-start detection unit 21 that detects contact of the tool to the workpiece, a cut-end detection unit 23 that detects release of the tool from the workpiece, and the processing surface center detection unit 22 that detects the processing surface center position based on a cut-start position and a cut-end position.

Figure 7:
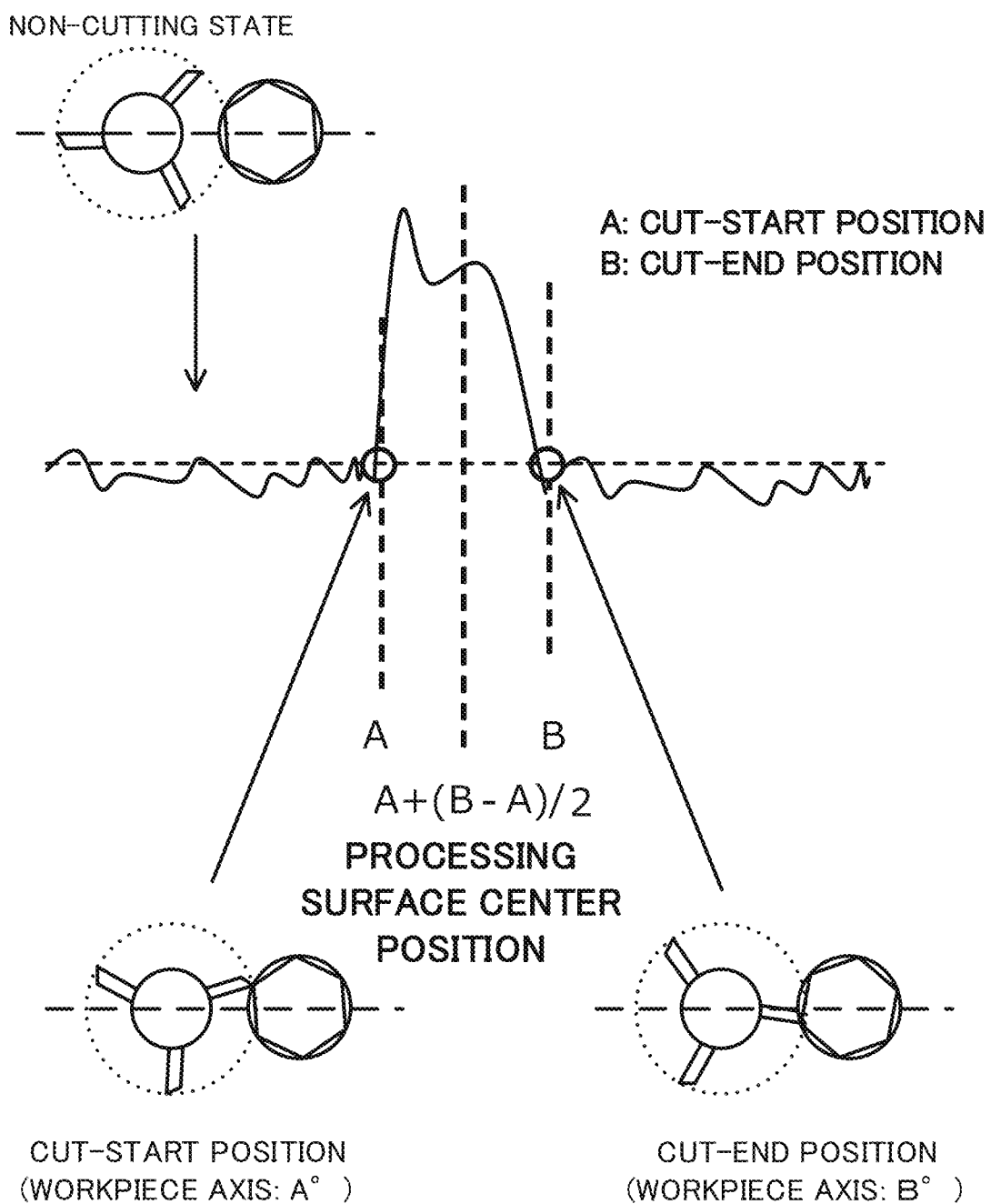
FIG. 7 is a diagram illustrating a detection method in a processing surface center detection unit.

FIG. 7 illustrates a method in which the position detection unit 18b detects the processing surface center position. In this example, load torque is used as processing data, and the processing surface of a workpiece is detected based on the position of a rotation axis of the workpiece (hereinafter, referred to as a workpiece axis). In a non-cutting state where the tool is not in contact with a workpiece, since the load applied to the rotation axis of the workpiece is low, the load torque changes within a low value. When the workpiece and the tool come into contact with each other, the load torque rises, and the position A of the workpiece axis at this time is referred to as a cut-start position. When the workpiece and the tool are simultaneously rotated and the workpiece is separated (released) from the tool, the load torque falls. The position B of the workpiece axis at this time is referred to as a cut-end position. Since the processing surface center position is at the middle of the cut-start position and the cut-end position, the position detection unit 18b finds the processing surface center position P by using the following equation.

$$P = A + (B-A)/2$$

Figure 8:
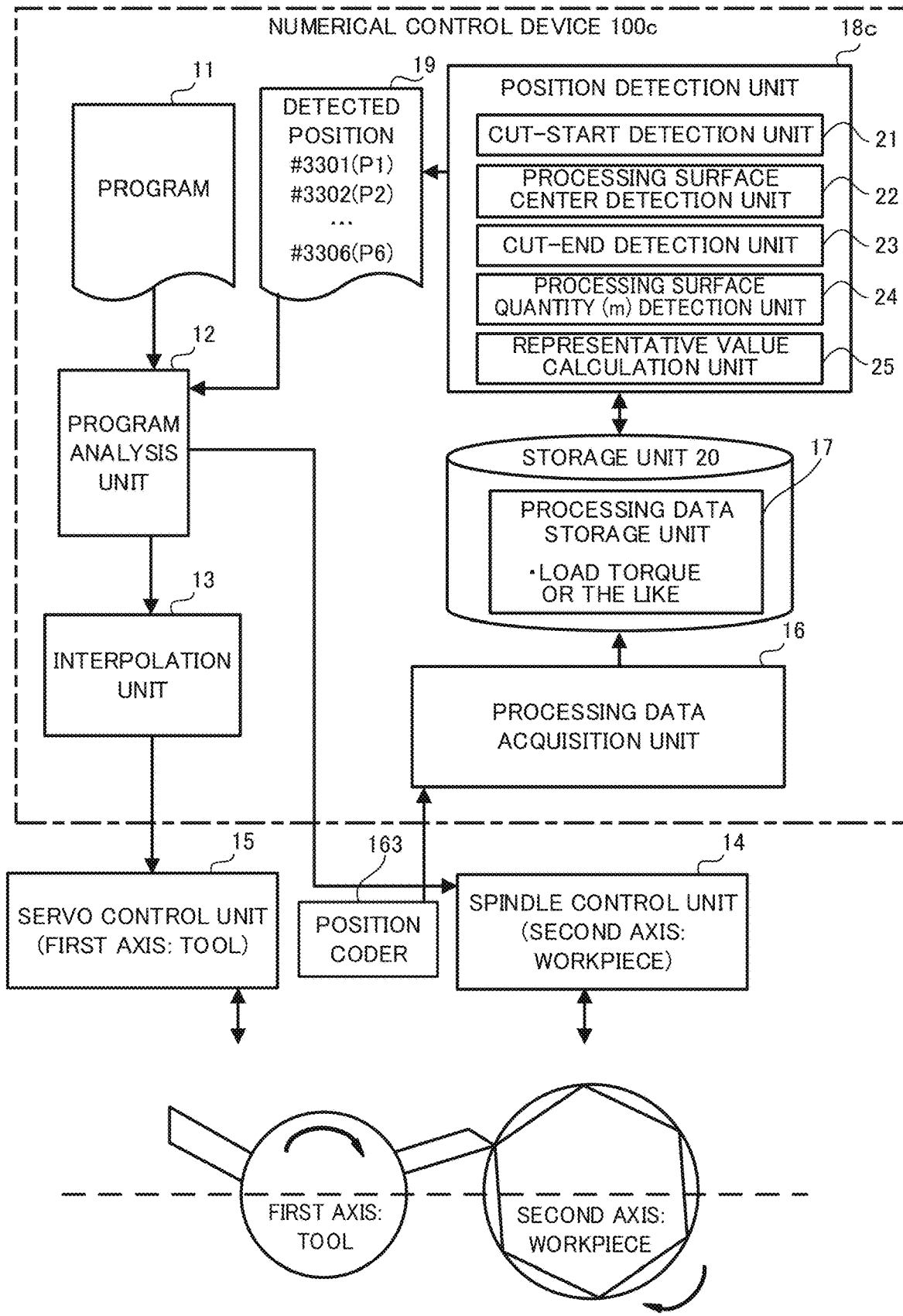
FIG. 8 is a block diagram of a numerical control device in the present embodiment.

A numerical control device 100c illustrated in FIG. 8 has a function of increasing accuracy of the processing surface center position P. A position detection unit 18c of the numerical control device 100c includes a processing surface quantity detection unit 24 that detects the number of processing surfaces formed on a workpiece and a representative value calculation unit 25 that calculates a representative value of a plurality of detected processing surface center positions. The numerical control device 100c finds a processing surface center position for multiple times and finds the representative value thereof (the mean value in this example).

Note that the cut-start detection unit 21, the cut-end detection unit 23, and the processing surface center detection unit 22 have the same functions as those in the numerical control device 100b that has already been described. Thus, the same references are provided, and the description thereof will be omitted.

Figure 9A:
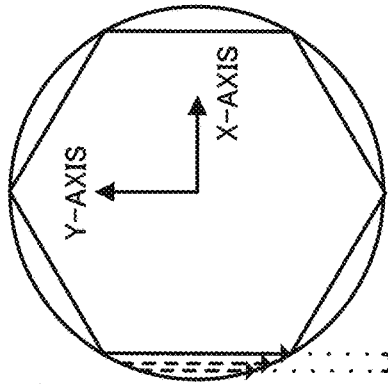
FIGS. 9A to 9C are diagrams illustrating change in load torque when cutting processing surface multiple of times.
Figure 9B:
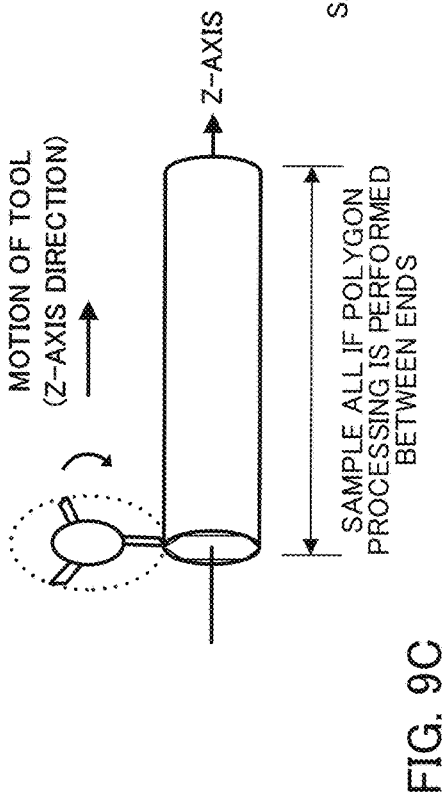
Figure 9C:
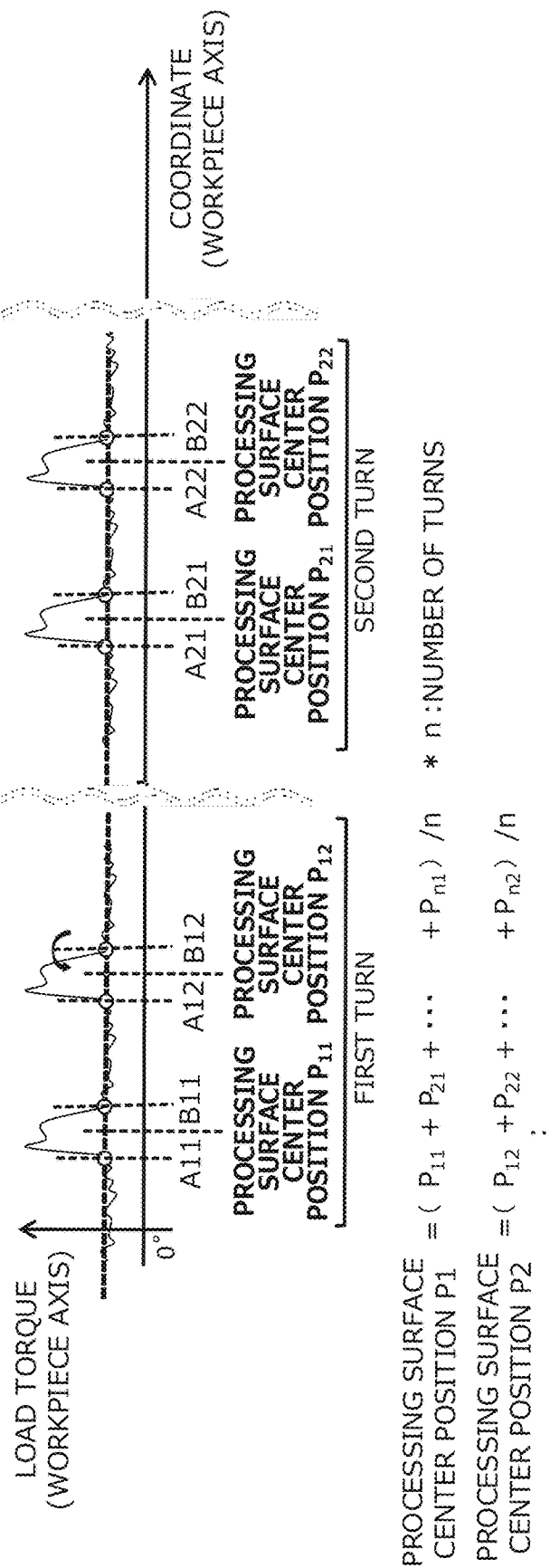

FIGS. 9A to 9C illustrates a view when a workpiece is cut for multiple times. In FIG. 9A, the tool moves along the longer axis (Z-axis) of the workpiece while being rotated and performs polygon processing. FIG. 9C illustrates change in the load torque during polygon processing. In polygon processing, the load torque rises and falls every time a processing surface is formed. The number of faces of a polyhedron is equal to the number of times that the load torque rises (or falls) while the workpiece axis rotates by 360 degrees (makes one turn). When the load torque rises for m times while the workpiece axis makes one turn, the number of faces of a polyhedron formed with respect to the workpiece axis is m.

With knowledge of the number of faces of a polyhedron, it is possible to associate processing data and processing surfaces with each other. For example, when the number of faces of a polyhedron is m, processing is repeated for the first face to the m-th face. In the present embodiment, the cut-start position is denoted as $A_{ij}$, the cut-end position is denoted as $B_{ij}$, and the processing surface center position is denoted as $P_{ij}$. The index ij represents the number of turns and the number of faces. For example, $A_{11}$ represents a cut-start position of the first face in the first turn, $A_{12}$ represents a cut-start position of the second face in the first turn, . . . , and $A_{nm}$ represents a cut-start position of the m-th face in the n-th turn. $B_{11}$ represents a cut-end position of the first face in the first turn, $B_{12}$ represents a cut-end position of the second face in the first turn, . . . , and $B_{nm}$ represents a cut-end position of the m-th face in the n-th turn.

Further, $P_{11}$ represents the processing surface center position for the first face in the first turn, $P_{12}$ represents the processing surface center position for the second face in the first turn, . . . , and $P_{nm}$ represents the processing surface center position for the m-th face in the n-th turn.

The representative value calculation unit 25 finds a representative value (the mean value in this example) of respective processing surface center positions by using the values $P_{11}$, . . . , $P_{nm}$ of the processing surface center positions detected by the processing surface center detection unit. Equations used for finding the mean value is as follows, where n denotes the number of turns.

Processing surface center position $P_1$ (the mean for the first face)=$(P_{11}+P_{21}+ \ldots +P_{n1})/n$ Processing surface center position $P_2$ (the mean for the second face)=$(P_{12}+P_{22}+ \ldots +P_{n2})/n$

. . .

Processing surface center position $P_m$ (the mean for the m-th face)=$(P_{1m}+P_{2m}+ \ldots +P_{nm})/n$ In such a way, the mean value can be produced by dividing the sum of respective processing surface center position by the number of turns n after the workpiece axis is rotated for n turns (or when processing data for n turns is being selected).

As a representative value, a statistical amount such as a median value or a mode value other than a mean value may be used. Further, the deeper the cutting is, the higher the accuracy becomes, and it is therefore preferable to use processing data on and after a certain number of times without using the first detected processing data. Weighting may be added to processing data when calculating representative value.

Further, as illustrated in FIG. 9B, a workpiece can be cut with the z-axis being fixed where the tool cuts the same surface of the workpiece multiple times and the cutting depth in the X-axis direction gradually increases. Also in such processing, it is possible to detect the processing surface center position for multiple times and calculate a representative value of the detected processing surface center positions.

The numerical control device 100c of FIG. 8 stores the value of a processing surface center position as a detected position. In this example, variables of #3301 to #3306 is stored. Those variables #3301 to #3306 correspond to the processing surface center positions P1 to P6 for the first face to the sixth face of a hexagon formed on the workpiece surface. When stored as variables, the automatically detected processing surface center positions can be referenced in a program and can be used in additional processing after polygon processing.

FIG. 10 is an example of a program using variables. In program example 1, program "G00 C#3301" instructs a C-axis to move to #3301 with the result of that the tool tip faces to the center position of the P1 face. Program "G00 C#3304" instructs the C-axis to move to #3304 with the result of that the tool tip faces to the center position of the P4 face. Program "G00 C [#3305+30.0]" instructs the C-axis to move to #3305 plus 30 degrees with the result of that the tool tip moves to the P5 face center+30 degrees.

Program example 2 of FIG. 10 creates instructions P1, P2, . . . , Pm dedicated to calculation. The instructions P1, P2, . . . , Pm correspond to the processing surface center positions P1, P2, . . . , Pm. Program "G00 C00 P4" instructs the C-axis to move to the center position of the P1 face with the result of that the tool tip faces to the center position of the P1 face. Program "G00 c00 P4" instructs the C-axis to move to the center position of the P4 face with the result of that the tool tip faces to the center position of the P4 face. Program "G00 c00 p5 Q30.0" instructs the C-axis to move the center position of the P5 face plus 30 degrees with the result of that the tool tip moves to the P5 face center+30 degrees.

Figure 11:
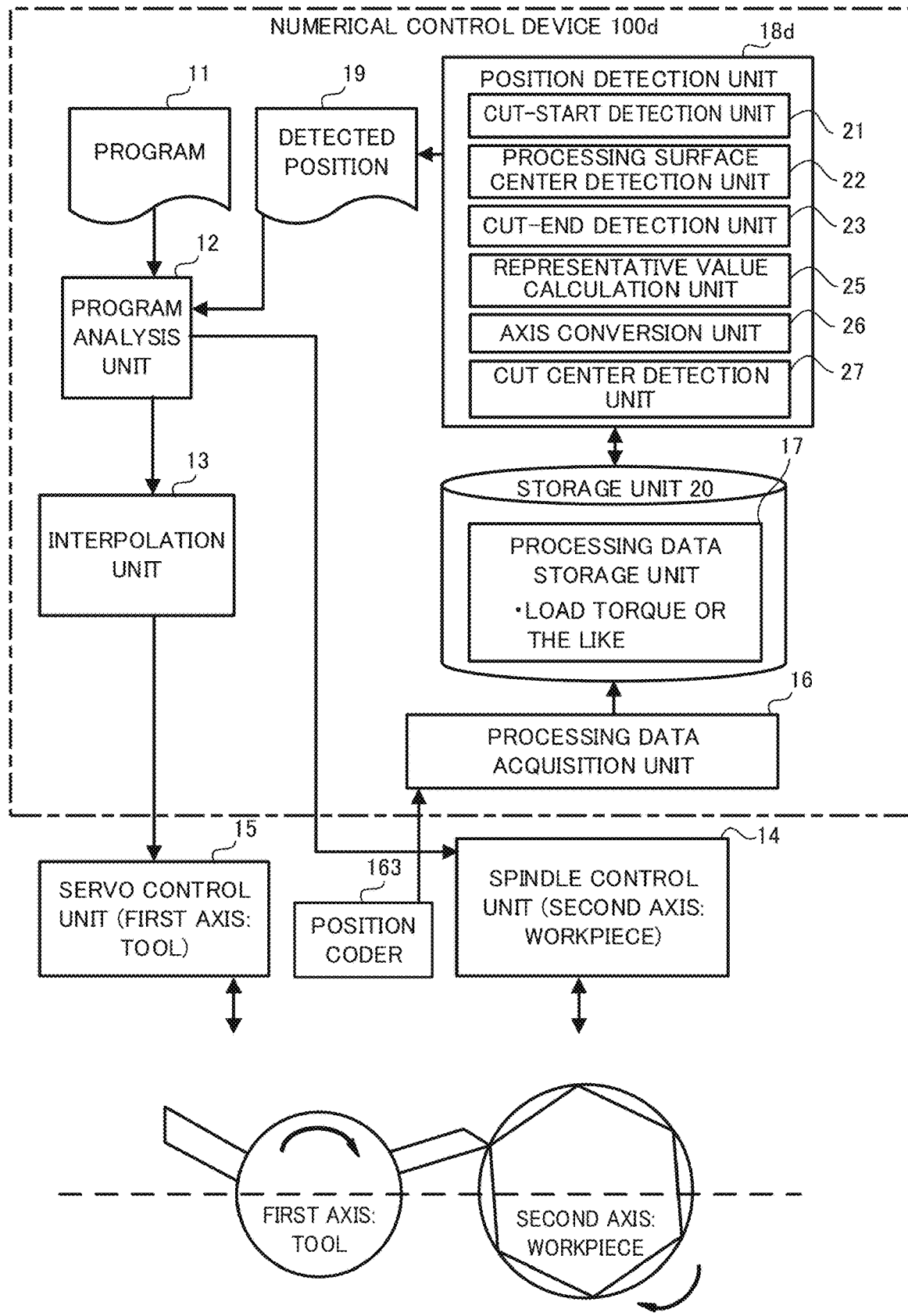
FIG. 11 is a block diagram of a numerical control device in the present embodiment.

Next, a numerical control device 100d that is another embodiment of the present disclosure will be described with reference to FIG. 11. A position detection unit 18d of the numerical control device 100d has an axis conversion unit 26 that converts the position of the tool axis into the position of the workpiece axis. In this example, the axis conversion unit 26 performs an axis conversion process from the cut face center position P' of the tool axis to the processing surface center position P''' of the workpiece axis. The cut face center position of the tool axis can be detected from a position (angle) at which the tool starts cutting and a position (angle) at which the tool stops cutting. A cut face center detection unit 27 detects a cut-start position and a cut-end position by using processing data. The center of those two positions is the cut face center position of the tool axis. The detection method is the same as that in the position detection unit 18 of FIG. 6.

When the cut-start position of the tool $A'_{lk}$ and the cut-end position of the tool $B'_{lk}$ are assigned to the equation for finding the processing surface center position "P=A+(B−A)/2", the cut face center position of the tool axis $P'_{11}$ to $P'_{22}$ can be found by the equations illustrated below. Herein, the cut-start position of the tool is denoted as $A'_{lk}$, the cut-end position is denoted as $B'_{lk}$, and the cut face center position is denoted as $P''_{lk}$. The index $_{lk}$ represents the number of turns l of the tool and the number of cut faces k processed by the tool. Note that as the workpiece axis rotates at twice speed of the tool axis, Equations for finding the cut center positions $P'_{11}$ to $P'_{22}$ are established one turn of the workpiece for two turns of the tool. Also in a case of two or more turns, the cut center position can be found in the same manner.

$P_{11}'=A_{11}'+(B_{11}'-A_{11}')/2$
$P_{12}'=A_{12}'+(B_{12}'-A_{12}')/2$
$P_{13}'=A_{13}'+(B_{13}'-A_{13}')/2$
$P_{21}'=A_{21}'+(B_{21}'-A_{21}')/2$
$P_{22}'=A_{22}'+(B_{22}'-A_{22}')/2$
$P_{23}'=A_{23}'+(B_{23}'-A_{23}')/2$

The axis conversion unit 26 performs (1) conversion of the number of turns and the cut face (processing surface) and (2) conversion of the position (angle).

(1) In the conversion of the number of turns and the cut face (processing surface), the number of turns l of the tool axis is converted into the number of turns j of the workpiece axis, and the cut face k of the tool axis is converted into the processing surface i of the workpiece axis. In polygon processing, a relationship (the number of turns of the tool axis, l)×(the number of cutting operations per one turn, h)+(the cut face of the tool axis, k)=(the number of processing surfaces, m)×(the number of turns of the workpiece axis, j)+(the processing surface of the workpiece axis, i) is established between the tool axis and the workpiece axis. Furthermore, since the turn ratio of the tool axis and the workpiece axis is constant and the number of cutting operations h per one turn of the tool axis is the same as the number of blades of the tool, if the number of turns l of the tool axis and the cut face k of the tool are determined, conversion into the number of turns j of the workpiece axis and the processing surface i of the workpiece is possible.

(2) The conversion of positions (angles) uses the turn ratio of the tool axis and the workpiece axis and calculates the position of the workpiece axis relative to the position of the tool axis. For example, when the turn ratio of the tool axis and the workpiece axis is R:S, the position (angle) and the tool axis by S/R are multiplied, and thereby the turn amount of the workpiece axis is found. Conversion from the position of the tool axis into the position of the workpiece axis is completed by adding an initial phase difference θ between the tool axis and the workpiece axis to the value of the above turn amount.

In the example of FIGS. 12A to 12C, since the turn ratio of the tool axis and the workpiece axis is 2:1, S/R is ½, and conversion equations are as follows. In this example, processing data for two turns of the tool axis is converted into processing data for one turn of the workpiece axis. Note that, although the processing center position of the tool axis is converted into the processing center position of the workpiece axis in this example, the cut-start position A' or the cut-end position B' of the tool axis may be converted into a cut-start position or a cut-end position of the workpiece axis.

$P_{11}''=\theta+P_{11}'/2$
$P_{12}''=\theta+P_{12}'/2$
$P_{13}''=\theta+P_{13}'/2$
$P_{14}''=\theta+P_{21}'/2$
$P_{15}''=\theta+P_{22}'/2$
$P_{16}''=\theta+P_{23}'/2$ The equations in FIG. 12C shows a way of finding the processing surface center position Pi when the workpiece is rotated for n times. In FIG. 12C, the mean of the processing surface center position $P_{ij}$ and the processing surface center position $P''_{ij}$ becomes the processing surface center position Pi. The processing surface center position $P_{ij}$ is detected from processing data of the workpiece axis. The processing surface center position $P''_{ij}$ is obtained by changing the cut face center position $P'_{ij}$ of the tool axis to the workpiece axis. Equations for calculating the mean are as follows (n denotes the number of turns of the workpiece axis).

Processing surface center position $P1$(first face)= $(P_{11}+\ldots+P_{n1}+P_{11}''+\ldots+P_{n1}'')/2n$ Processing surface center position $P2$(second face)= $(P_{12}+\ldots+P_{n2}+P_{12}''+\ldots+P_{n2}'')/2n$ Although the mean is calculated here from the sum of the processing surface center position $P_{ij}$ detected from processing data of the workpiece axis and the processing surface center position $P''_{ij}$ resulted by changing the cut face center position $P'_{ij}$ of the tool axis to the workpiece axis, the mean of any one of the above may be calculated.

Figure 13:
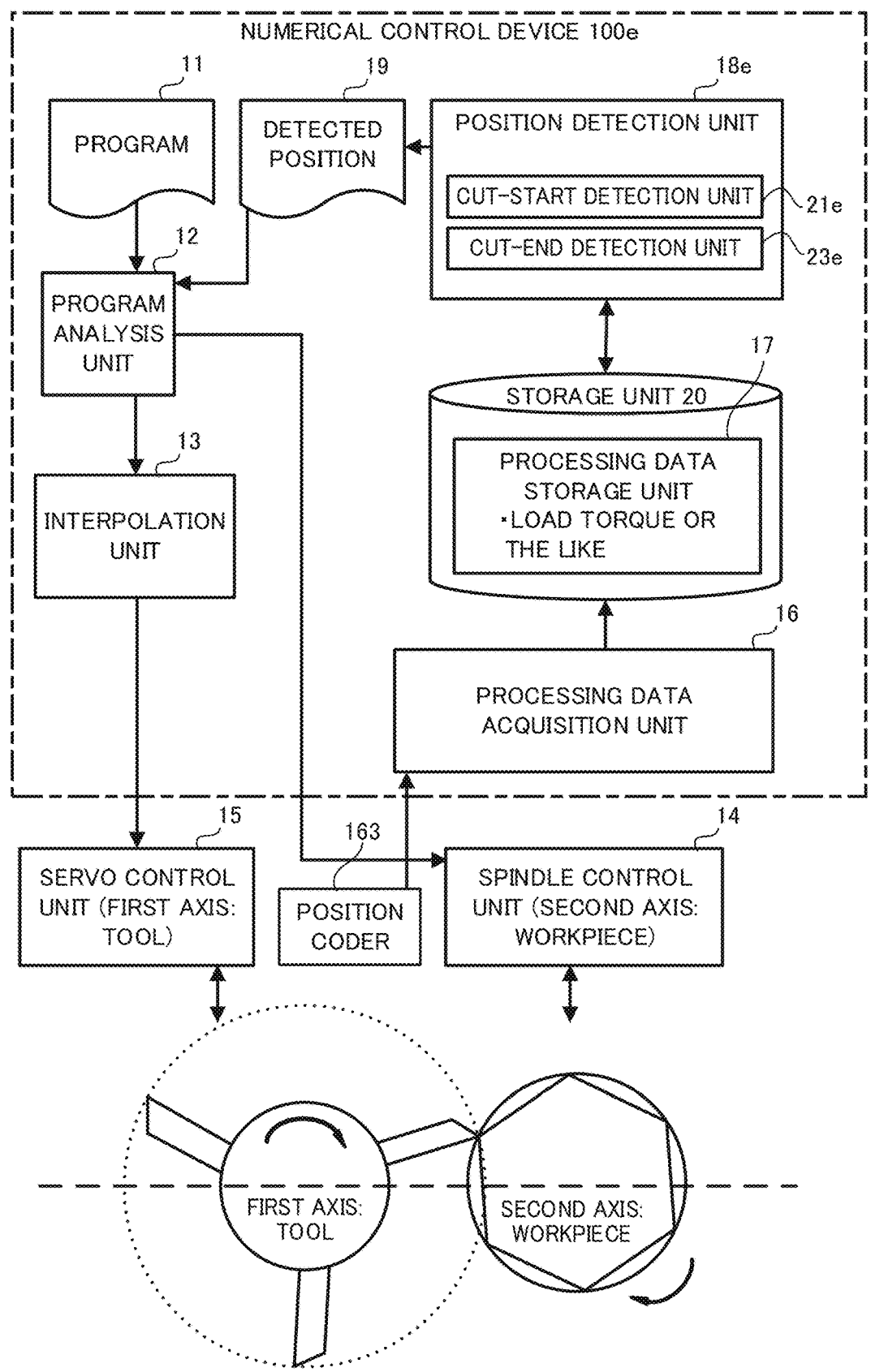
FIG. 13 is a block diagram of a numerical control device in the present embodiment.

Next, a numerical control device 100e that is another embodiment of the present disclosure will be described with reference to FIG. 13. A cut-start detection unit 21e and a cut-end detection unit 23e of the numerical control device 100e perform a process of preventing erroneous detection.

Figure 14:
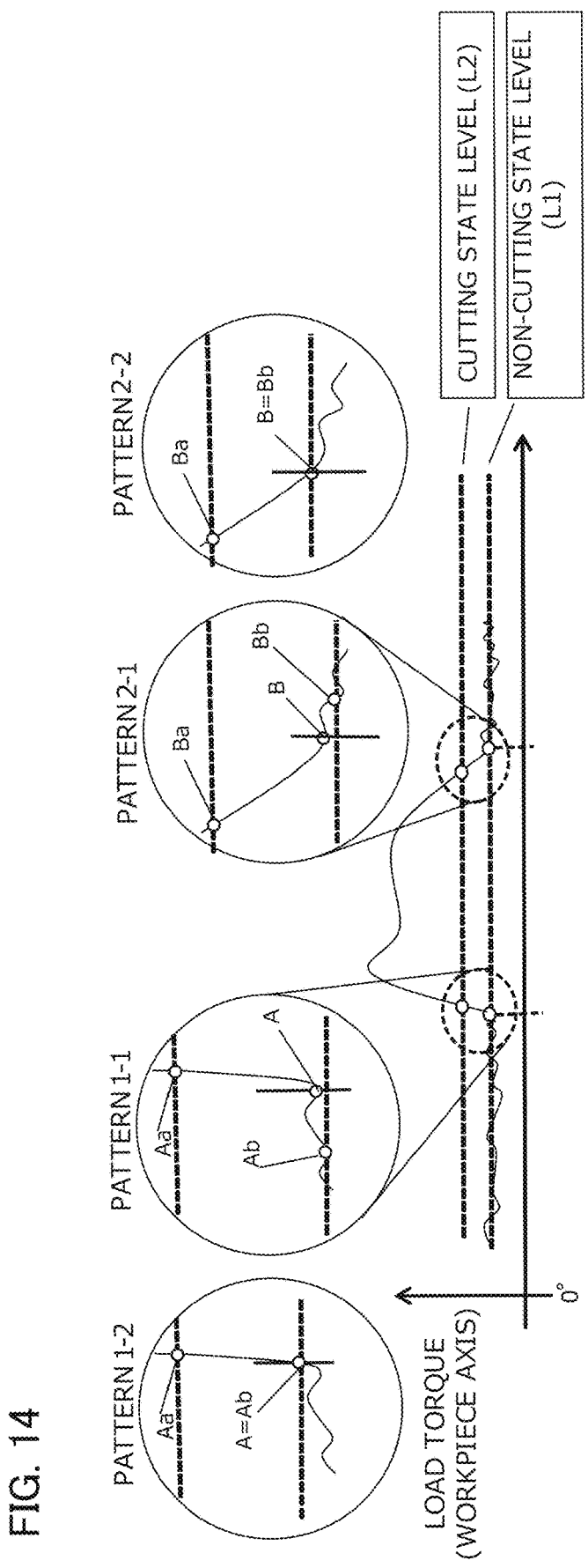
FIG. 14 is a diagram illustrating a prevention process against erroneous detection.

FIG. 14 illustrates a process of preventing erroneous detection when load torque is used as processing data. The numerical control device 100e sets two values of a non-cutting state level (L1) and a cutting state level (L2).

The non-cutting state level (L1) may be, for example, an average value of load torque in non-cutting state (the average load torque before cutting is started after a specified number of turns is reached).

The cutting state level (L2) may be, for example, a value obtained by adding a predetermined value "a" to the non-cutting state level (L1), a load level of b % of the non-cutting state level (L1). The cutting state level (L2) may be an experimental value found from the actual processing data. The cutting state level (L2) may be a value suitable for preventing erroneous detection.

The cut-start detection unit 21e detects an angle Aa of the workpiece axis when the load torque reaches the cutting state level (L2) and an angle Ab of the workpiece axis when the load torque reaches the non-cutting state level (L1) before detecting the angle Aa. The cut-start detection unit 21e classifies the displacement of the load torque between Aa and Ab into two patterns of a pattern 1-1 and a pattern 1-2. In the pattern 1-1, the load torque increases and decreases between the angles Aa and Ab. In such a case, an angle when the load torque transitions from minus to plus is selected as the cut-start angle A. In the pattern 1-2, the load torque monotonically increases between the angles Aa and Ab. In such a case, the angle Ab when the load torque reaches the non-cutting state level (L1) is selected as the cut-start angle A.

The cut-end detection unit 23e monitors the load torque and detects an angle Ba when the load torque decreases to the cutting state level (L2) and an angle Bb when the load torque is the non-cutting state level (L1) after detecting the angle Ba. The cut-end detection unit 23e classifies the displacement of the load torque between Ba and Bb into two patterns of a pattern 2-1 and a pattern 2-2. In the pattern 2-1, the load torque increases and decreases between the angles Ba and Bb. In such a case, an angle when the load torque transitions from plus to minus is selected as the cut-end angle B. In the pattern 2-2, the load torque monotonically decreases between the angles Ba and Bb. In such a case, the angle Bb when the load torque reaches the non-cutting state level (L1) is selected as the cut-end angle B.

Fluctuation occurring when the tool comes into contact with or is released from the workpiece may cause erroneous detection. Since the cut-start detection unit 21e and the cut-end detection unit 23e classify patterns of change in processing data that may occur at contact or release and, in accordance with the pattern, select appropriate values, erroneous detection can be prevented.

Next, the operation of the numerical control device 100c will be described with reference to FIG. 15.

The numerical control device 100c performs polygon processing. The processing data acquisition unit 16 acquires processing data (load torque in this example) of a machine tool to be controlled and the position of the workpiece axis (or the tool axis) at this time. The processing data is stored in the processing data storage unit 17 in association with the position of the workpiece axis (step S1).

The cut-start detection unit 21 of the position detection unit 18c detects a cut-start angle At from the processing data stored in the processing data storage unit 17. The cut-end detection unit 23 detects a cut-end angle Bt from the processing data stored in the processing data storage unit 17 (step S2). Herein, t denotes the detection number of the angle A and the angle B.

The processing surface center detection unit 22 detects the center angle Dt of the processing surface based on the cut-start angle At and the cut-end angle Bt. The equation for detecting the processing surface center position is Dt=At+(Bt−At)/2 (step S3).

The processing surface quantity detection unit 24 measures the number of processing surface center positions Dt detected during the axis rotating the initial one turn (0 to 360 degrees) of the workpiece axis. The number of processing surface center positions Dt detected in one turn corresponds to the number of faces m of the processing surface (step S4).

The representative value calculation unit 25 converts the value of the processing surface center positions Dt into $P_{ij}$. The index i of $P_{ij}$ denotes the number of turns, and the index j denotes a processing surface. FIG. 16B illustrates a view of conversion from Dt into $P_{ij}$.

D1 to Dm are processing surface center positions of first turn then D1 to Dm are converted into $P_{11}$ to $P_{1m}$. Dm+1 to Dm+m are processing surface positions of second turn then Dm+1 to Dm+m are converted into $P_{21}$ to $P_{2m}$. D(n−1)*m+1 to Dn*m are processing surface center positions of n-th turn then D(n−1)*m+1 to Dn*m are converted into $P_{n1}$ to $P_{nm}$ (step S5).

The representative value calculation unit 25 classifies the processing surface center positions Dt by the number of turns and the processing surface and then calculates the mean value of the processing surface center positions by the processing surface. FIG. 16C illustrates equations for calculating the mean value of processing surface center positions. The representative value calculation unit 25 calculates the sum of $P_{ij}$ having the same index j and divides the sum of $P_{ij}$ by the number of turn n and obtains the mean value Pj of the processing surface center position $P_{ij}$. The calculated values P1, ..., Pm are stored as detected positions (step S6).

Figure 15:
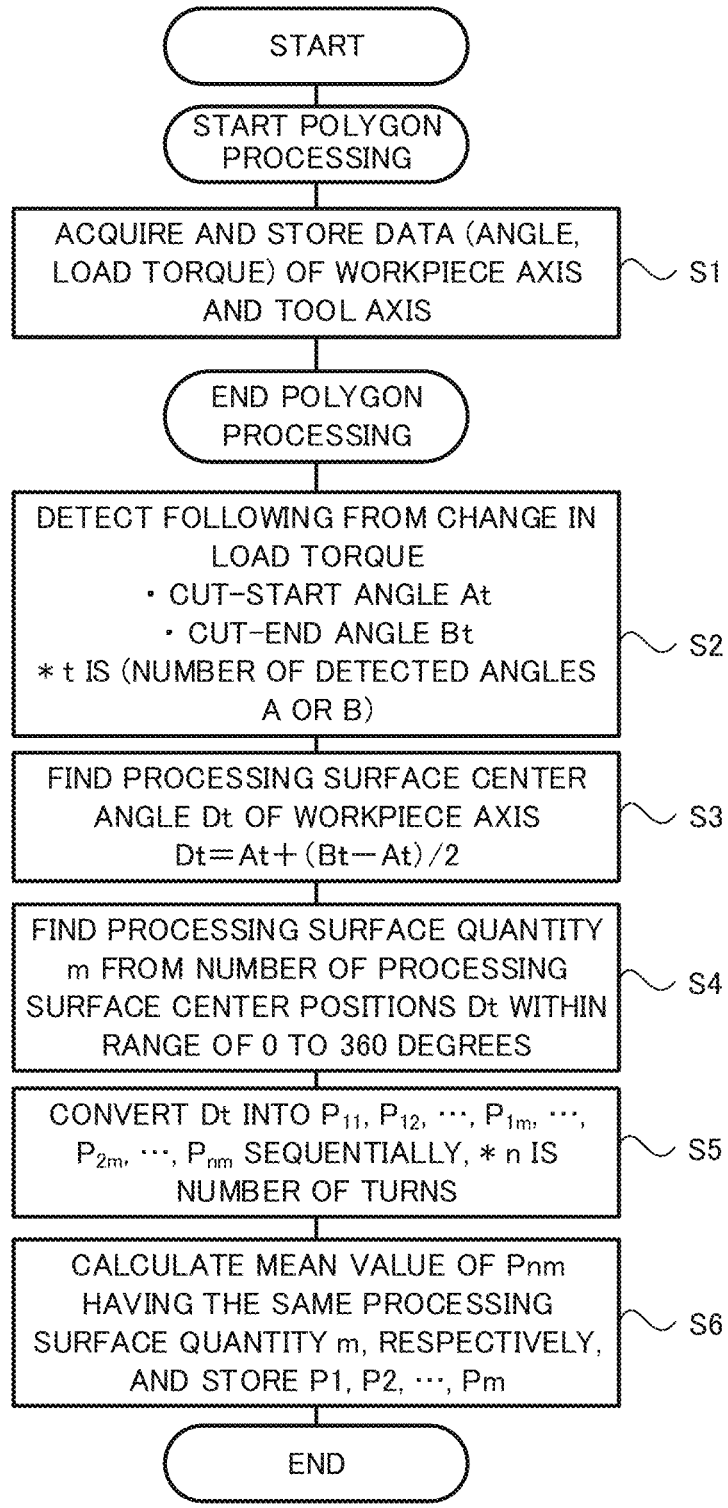
FIG. 15 is a flowchart illustrating the operation of the numerical control device.

FIG. 17 illustrates an example of a program that causes the machine tool to perform the operations illustrated in the flowchart of FIG. 15. In this program, after the tool axis is positioned by "G00X100.0Z20.0S1000M03", start of polygon processing is instructed by "G51.2 P1 Q2". Cutting in the X-axis direction is instructed by "G01X80.0F10.0", standby for 2 seconds is instructed by "G04X2.0", retraction in the X-axis direction is instructed by "G00X100.0", the end of polygon processing is instructed by "G50.2", and the workpiece axis is then stopped by "S0M05". This process corresponds to step S1 of the flowchart. The numerical control device 100 detects the position of the processing surface based on the processing data collected herein and stores the detected results in variables (#3301 to #330m in this example).

This program then provides an instruction of additional processing after the end of the polygon processing. The machine tool selects a tool (drill) for additional processing by "T2". At "G00X50.0", positioning of the tool is performed. At "G83C#3301X−40.0F5.0", the variable "#3301" is applied, that is, the C-axis (workpiece axis) is moved to the processing surface center position of the P1 face, and the processing surface center position is drilled in the X-axis direction. Similarly, at "C#3302", the variable "#3302" is applied, that is, the processing surface center position of the P2 face is drilled. At "C[#3305+30.0]", the variable "#3305" is applied, that is, a face inclined by 30 degrees from the processing surface center position of the P5 face is drilled.

The fixed cycle is stopped at "G80M5", and the main axis is stopped. Finally, the program ends at "M30". With the processing surface center position being stored as a variable in such a way, processes of polygon processing and additional processing can be described in a single program.

As described above, each of the numerical control devices 100 to 100e of the present embodiment acquires data during processing of polygon processing and detects the position of a processing surface formed on a workpiece based on the processing data and therefore can position the workpiece by using the detected position information. This eliminates the need for preparatory planning workpiece such as matching the blade edge position of a tool to the center of a workpiece.

The invention claimed is:

1. A control device that controls a machine tool having a first axis that rotates a tool and a second axis that rotates a workpiece and configured to rotate the first axis and the second axis and process the workpiece into a polygon, the control device comprising:
   a processing data acquisition unit that acquires processing data that changes in accordance with processing of the workpiece; and
   a position detection unit that detects a position of a processing surface on the workpiece based on a change in the processing data,
   wherein the position detection unit detects contact between the workpiece and the tool in accordance with a change in the processing data and detects a position of a processing surface of the workpiece based on at least one of a position of the first axis and a position of the second axis when the contact is detected, and
   wherein the position detection unit
      detects release of the workpiece and the tool from each other in accordance with a change in the processing data, and
      detects a position of a processing surface of the workpiece based on at least one of a position of the first axis and a position of the second axis when the workpiece and the tool come into contact with each other and at least one of a position of the first axis and a position of the second axis when the tool and the workpiece are released from each other.

2. A control device configured to control a machine tool having a first axis for rotating a tool and a second axis for rotating a workpiece, and configured to rotate the first axis and the second axis for performing a polygon processing to process the workpiece into a polygon, the control device comprising:
   a processing data acquisition unit configured to acquire processing data that changes in accordance with the polygon processing of the workpiece; and
   a position detection unit configured to detect a position of a processing surface on the workpiece based on a change in the processing data,
   wherein the position detection unit is configured to
      detect contact between the workpiece and the tool in accordance with a change in the processing data, and
      detect the position of the processing surface of the workpiece based on at least one of a position of the first axis and a position of the second axis when the contact is detected, and
   wherein the position detection unit is configured to detect, as a center position of the processing surface, a center of a position of the second axis when the workpiece and the tool come into contact with each other and a position of the second axis when the workpiece and the tool are released from each other.

3. A control device configured to control a machine tool having a first axis for rotating a tool and a second axis for rotating a workpiece, and configured to rotate the first axis and the second axis for performing a polygon processing to process the workpiece into a polygon, the control device comprising:

a processing data acquisition unit configured to acquire processing data that changes in accordance with the polygon processing of the workpiece; and a position detection unit configured to detect a position of a processing surface on the workpiece based on a change in the processing data, wherein the position detection unit is configured to detect a center position of the processing surface of the workpiece, and wherein the position detection unit is configured to detect the center position of the processing surface based on at least one of a position of the first axis and a position of the second axis when contact between the workpiece and the tool is detected, and a cutting amount of the tool relative to the workpiece.

4. A control device configured to control a machine tool having a first axis for rotating a tool and a second axis for rotating a workpiece, and configured to rotate the first axis and the second axis for performing a polygon processing to process the workpiece into a polygon, the control device comprising:

a processing data acquisition unit configured to acquire processing data that changes in accordance with the polygon processing of the workpiece;

a position detection unit configured to detect a position of a processing surface on the workpiece based on a change in the processing data; and a processing surface quantity detection unit configured to measure a number of times that the processing data changes during one turn of the second axis, and detect a number of processing surfaces formed on the workpiece.

5. A control device configured to control a machine tool having a first axis for rotating a tool and a second axis for rotating a workpiece, and configured to rotate the first axis and the second axis for performing a polygon processing to process the workpiece into a polygon, the control device comprising:

a processing data acquisition unit configured to acquire processing data that changes in accordance with the polygon processing of the workpiece;

a position detection unit configured to detect a position of a processing surface on the workpiece based on a change in the processing data; and an axis position conversion unit configured to convert a position of the first axis into a position of the second axis or convert the position of the second axis into the position of the first axis based on a turn ratio of the first axis and the second axis.

* * * * *